United States Patent
Sato et al.

(10) Patent No.: US 6,946,026 B2
(45) Date of Patent: Sep. 20, 2005

(54) RELEASE AGENT FOR METALLIC MOLD

(76) Inventors: Shigekatu Sato, deceased, late of Kawasaki (JP); by Hiroaki Sato, legal representative, 3-7-7, Karahira, Aso-ku, Kawasaki-city, Kanagawa (JP)

( * ) Notice: Subject to any disclaimer, the term of this patent is extended or adjusted under 35 U.S.C. 154(b) by 0 days.

(21) Appl. No.: 10/628,017

(22) Filed: Jul. 24, 2003

(65) Prior Publication Data

US 2004/0083925 A1 May 6, 2004

(30) Foreign Application Priority Data

Aug. 5, 2002 (JP) .................................... H2002-226801

(51) Int. Cl.$^7$ ............................................... B28B 7/36
(52) U.S. Cl. ........................... 106/38.22; 106/287.23; 106/287.26; 106/287.3; 106/628; 106/634; 524/183
(58) Field of Search .................. 106/38.22, 287.23, 106/287.26, 287.3, 628, 634; 524/183

(56) References Cited

U.S. PATENT DOCUMENTS

| | | | | |
|---|---|---|---|---|
| 3,316,287 A | * | 4/1967 | Nunn, Jr. et al. ........... | 558/294 |
| 3,539,529 A | * | 11/1970 | Seki et al. ................... | 524/182 |
| 3,645,897 A | * | 2/1972 | Gower et al. ................ | 508/158 |
| 3,804,875 A | * | 4/1974 | Ludwig et al. .............. | 558/289 |
| 4,141,851 A | * | 2/1979 | Askew et al. ............... | 252/78.3 |
| 4,298,488 A | * | 11/1981 | Tanizaki et al. ............ | 252/78.1 |
| 4,450,087 A | * | 5/1984 | Askew et al. ................ | 252/73 |
| 5,236,514 A | * | 8/1993 | Leung et al. ............. | 134/22.14 |
| 5,854,324 A | * | 12/1998 | Tajima et al. ............... | 524/232 |
| 5,948,844 A | * | 9/1999 | Oka et al. ................... | 524/399 |
| 6,235,821 B1 | * | 5/2001 | Saito .......................... | 524/161 |

FOREIGN PATENT DOCUMENTS

| | | | |
|---|---|---|---|
| GB | 1090565 | * | 11/1967 |
| JP | 61-83293 | * | 4/1986 |
| JP | 02-180941 | * | 1/1989 |
| JP | 04-252287 | * | 9/1992 |

\* cited by examiner

*Primary Examiner*—Bernard Lipman
(74) *Attorney, Agent, or Firm*—Butzel Long

(57) ABSTRACT

A release agent for metallic molds used for forming plastic molded products which release agent contains a borate ester of polyoxyalkylene.

2 Claims, No Drawings

RELEASE AGENT FOR METALLIC MOLD

BACKGROUND OF THE INVENTION

1. Field of the Invention

The present invention relates to a release agent for metallic molds used for forming plastic molded products.

2. Description of the Related Art

Plastics have excellent properties such as easy processability, high productivity, light weight and relative low procuring costs, so they are used for the parts and structural materials for automobiles, autobicycles, scooters, televisions, radios, audio equipment, washing machines, rice cookers, personal computers, portable telephones, game machinery, building materials, office supplies, stationery, toys, sports goods, sports equipment, agricultural tools and marine tools.

They are usually prepared by plastic processing methods such as injection molding, blow molding, compression molding, transfer molding, rotating molding, slush molding, inflation tubular film processes, and extrusion molding.

As plastics processing are conducted at high temperature above 200° C., additives, monomers, decomposed materials in the plastics are changed to carbonized materials such as tar, pitch and other colored sticky substances, which are apt to adhere to the surfaces of the screw, barrel, die and metallic mold of the plastic processing machine to cause transfer of the carbonized materials to the molded products.

Above mentioned transfer makes the surfaces of molded products dirty and makes the dimensions of the molded product inaccurate. As a result, the molded products do not perform required movement or structural functions. Therefore cleaning the screw, barrel, die and metallic mold of plastic processing machines has been required.

In case of production changes from specific colored molded articles to noncolored or different colored molded articles, cleaning the screw, barrel and die has been required to avoid cross contamination caused by residual specifically colored resin compounds.

However, there are some problems associated with conventional methods of cleaning the screw, barrel, die and metallic mold.

There are problems associated with releasing plastic molded products from metallic molds.

Metallic molds used for forming plastic molded products have complicated shapes with fine hollow and convex parts.

Therefore, plastic molded products such as mechanical parts for electronic devices and automobiles have complicated shapes. Consequently it is difficult to release plastic molded products from metallic molds, because both surfaces have complicated contrasting shape, which causes the plastic mold products to ingress into portions of the metallic mold and become anchored thereto.

To avoid above mentioned difficulty of releasing both surfaces, there have been efforts to treat the interface between the metallic mold and the plastic molded product.

The method of treating the interface involves using a lubricant as a release agent for metallic molds.

The lubricant is usually applied by coating it onto the metallic mold surfaces.

However, when a metallic mold that is coated with a conventional release agent is used for a long time, a hard and uneven heterogeneous layer is formed because of the following reasons.

One reason is the accumulation of resin and its additives such as antioxdants, metal deactivaters, nucleating agents, anti-ultraviolet agents, antistatic agents, crosslinking agents, valcanization agents and lubricants.

The other reason is the accumulation of decomposition materials of resin and its additives.

The uneven shape on the surface of metallic mold caused by the heterogeneous layer is apt to be transferred to the surface of the plastic molded product together with the accumulated contaminants from the surface of the metallic mold which will adhere to the surface of the plastic molded product.

Above mentioned transferring of shape makes the dimensions of the plastic molded product inaccurate so that it will not perform required movement or structural functions, and adhering of contaminants makes the surface of the plastic molded product dirty.

The hard and uneven heterogeneous layer on the surface of the metallic mold surface adversely affects the releasing property.

To remove the contaminants and heterogeneous layer from the surface of the metallic mold, it is common to wash the soiled metallic mold after a predetermined time of use.

At a plastic molded product facility, washing is carried out after the troublesome task of taking the soiled metallic mold out from plastic processing machine, and disassembling the plastic mold into pieces, which requires time and labor resulting in heavy loss of efficiency and cost.

Especially for complicated or large sized metallic molds, removing, dismantling and washing are tremendous and obstacles to improving the productivity and keeping cost down.

To decrease the number of times of metallic mold washing, a release agent has been employed.

As the release agent, there have been many known types that such as dimethyl polysiloxane of the non-crosslinking type, paraffin wax, higher fatty acid derivatives, metal soaps, talc, mica, polytetrafluoroethylene of the crosslinking type, and the like.

However, conventional release agents have the following drawbacks.

In case employing noncrosslinking type of release agent, the release agent stays in specific places of the metallic mold to affect bad influence to the plastic molded product.

In the case of employing a crosslinking type of release agent, the release agent will exhibit an excellent releasing property; however, the release agent is apt to adhere to the surface of a plastic molded product and prevent uniform painting or an adhering treatment, resulting to decrease post-processability.

In the case of requiring a sufficient releasing effect to achieve a short shot cycle time, the amount of release agent must be increased, result in the accumulation and degradation of the release agent on the metallic mold. This adversely affects the smooth and gross properties and the degradation of mechanical strength, including tensile, elongate and anti-impact strength.

Further, it has become a problem that the release agent itself is decomposed by the high temperature heat transfer from the metallic mold.

For instance, dimethyl polysiloxane oil which is a representative release agent gradually decomposes over the temperature of 150° C. and rapidly decomposes over the temperature of 200° C. to form a viscous gel-like material which degrades the releasing property.

For improving the heat-resistant property of dimethyl polysiloxane, the use of the amino-group or mercapto-group modified dimethyl polysiloxane has been proposed.

However, it has been discovered that the modified dimethyl polysiloxane generates a bad smell such as ammonia gas or mercaptan and discolors plastic molded products.

Also, a release agent using dimethyl polysiloxane must be prepared by dispersing it in the water to form micelles using a surface active agent, because dimethyl polysiloxane itself is not compatible with water.

A release agent using polytetrafluoroethylene has the drawback that it must be baked onto the surface of metallic mold. Therefore many troublesome repeated steps of baking must be conducted notwithstanding its excellent releasing effect and secondary processing properties.

It is desirable that the release agent for metallic molds be prepared as an emulsion type from viewpoint of cost, toxicity, ignition, handling and applicability.

Emulsion type agents are prepared by a method in which a surface active agent, water and non-water-soluble dimethyl polysiloxane oil or wax oil are agitated together to form micelles which are able to be dispersed in water.

However, above mentioned surface active agents react with ingredients that bleed from plastic molded products and form a strong membrane (coated layer) on the surface of the metallic mold.

The membrane (coated layer) is hard and has an uneven heterogeneous shape which is transferred to the surface of plastic molded products causing the production of out of standard plastic molded products.

On the other hand, when above mentioned release agent of the crosslinked type that requires baking is used, the baked membrane (coated layer) that exhibits the releasing effect is gradually scraped by the resin composition contacting to the metallic mold during each injection shot.

As the above mentioned baked type release agent is gradually scraped during each shot of plastic resin composition into metallic mold, the release agent is removed from the surface of metallic mold after from 10 to 20 repeating shots are preformed.

Then after 10 to 20 shots are preformed, fresh release agent must be applied onto the surface of metallic mold, which is a very troublesome task.

Further the above mentioned baked type release agent has the other problem of containing the reactive functional group such as amino, mercapto, isocyanate or vinyl group which is used for conducting crosslinking and the baking reaction on the surface of metallic mold.

Owing to the reactive functional group, the surface energy of the release agent layer on the metallic mold becomes very large to an increase in the frictional force between the surface of the plastic molded product and the surface of release agent layer, which causes consumption of the release agent layer by scraping during each injection shot, limiting the life of the release agent layer to a term of from 10 to 20 shots of injection mold material.

The short life of the release agent requires more frequent application of the release agent by the baking treatment, which leads to accumulation of unnecessary baked crosslinked release agent on the surface of the metallic mold, which adversely affects shape and contaminant transfer to the plastic molded product.

As mentioned above, conventional type release agents have drawbacks such as poor release effect, short durability term, difficult secondary processability and difficult application (baking) onto the metallic mold.

SUMMARY OF THE INVENTION

As a result of diligent investigation during the course of the present invention, the present invention provides a release agent for metallic molds used for forming plastic molded products which release agents contain a borate ester of a polyoxyalkylene.

DETAILED DESCRIPTION OF THE INVENTION

A borate ester of polyoxyalkylene used for the present invention is a chemical compound expressed by the following general formula (1).

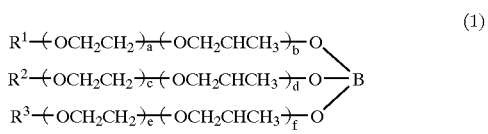

wherein R1, R2 and R3 are independently selected from the group consisting of hydrogen and hydrocarbon groups, a, b c, d, e and f are positive integers independently selected from 0 to 30 whose sum is from 6 to 80.

Examples of the hydrocarbon groups are alkyl groups such as methyl, ethyl, propyl, isopropyl, butyl, pentyl, hexyl, octyl, nonyl, decyl, dodecyl, hexadecyl, octadecyl and docosyl groups and phenyl, tolyl and cyclohexyl groups.

Illustrative of the borate ester of polyoxyalkylene are the chemical compounds expressed by the following general formula from (2) to (27).

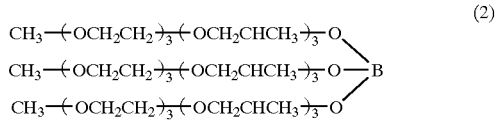

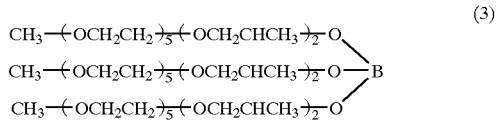

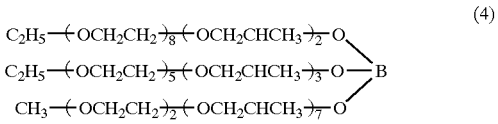

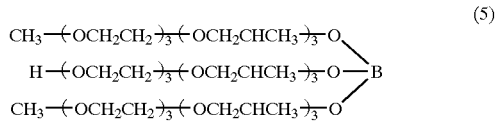

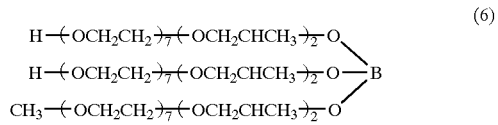

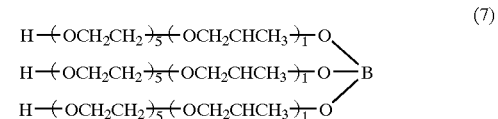

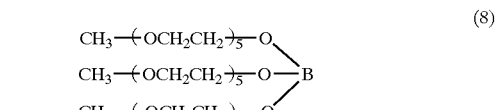

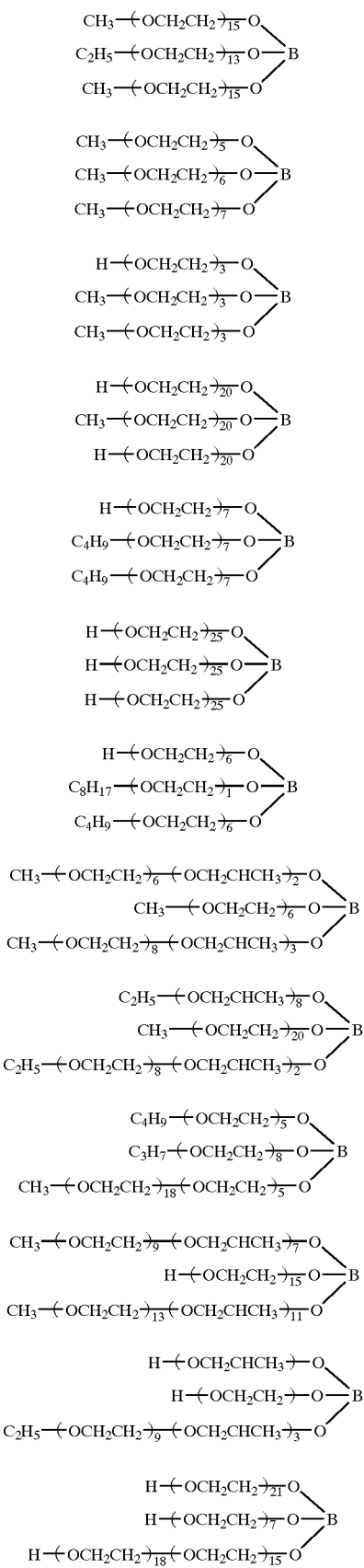
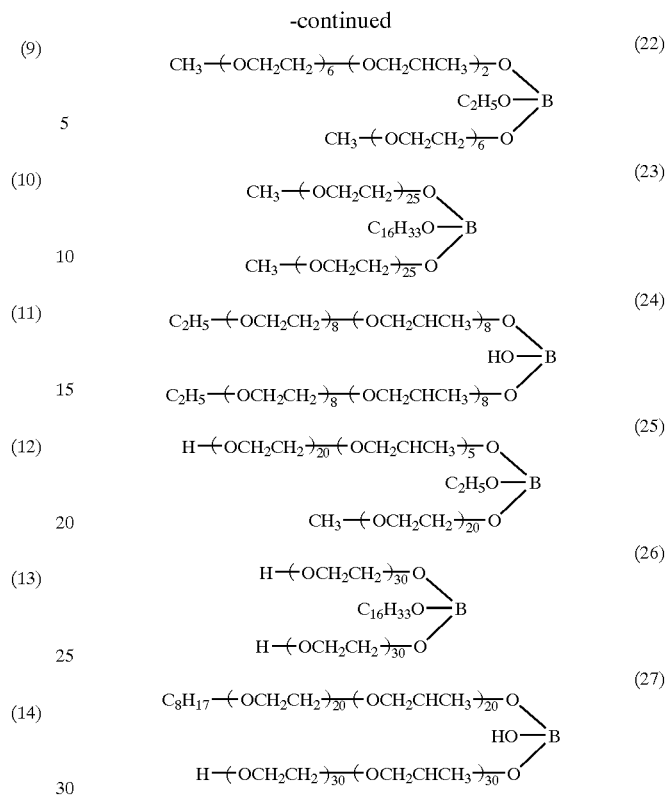

Production methods for making the borate esters of polyoxyalkylene used for the present invention are not limited to any specific method; however, following method is preferred.

The borate esters of polyoxyalkylene are produced by esterification-dehydration or ester exchange reaction by contacting a polyoxyalkylene expressed by the chemical formula (28) with boric acid or borate esters of lower alcohols such as methyl alcohol or ethyl alcohol.

It is preferred that reaction be carried out using 1 mol of boric acid or borate esters of lower alcohols with from 3 to 3.5 moles of polyoxyalkylene expressed by the chemical formula (28).

If the mole ratio is less than 3, undesirable byproducts of borate esters having two or three boron atoms are generated.

Other byproducts or unreacted polyoxalkylene may remain in the borate esters unless they hinder the purging effect of the resin composition of the present invention.

$$R^1(OCH_2CH_2)a(OCH_2CHCH_3)bOR^2 \quad (28)$$

wherein $R^1$ and $R^2$ are independently selected from the group consisting of hydrogen and a hydrocarbon group, a and b are independently selected from 0 to 30.

Examples of the hydrocarbon group are alkyl groups such as methyl, ethyl, propyl, isopropyl, butyl, pentyl, hexyl, octyl, nonyl, decyl, dodecyl, hexadecyl, octadecyl and docosyl groups and phenyl, tolyl and cyclohexyl groups.

Examples of the polyoxyalkylene expressed by the chemical formula (28) are as follows.
diethylene glycol monomethyl ether,
diethylene glycol monoethyl ether,
diethylene glycol monoisopropyl ether,
diethylene glycol monobutyl ether,
diethylene glycol monooctyl ether,
diethylene glycol monodecyl ether,
diethylene glycol monohexadecyl ether, diethylene glycol monooctadecyl ether,
triethylene glycol monomethyl ether,
triethylene glycol monoethyl ether,
triethylene glycol monoisopropyl ether,
triethylene glycol monobutyl ether,
triethylene glycol monobutyl ether,
triethylene glycol monooctyl ether,
triethylene glycol monodecyl ether,
triethylene glycol monohexadecyl ether,
triethylene glycol monooctadecyl ether,
tetraethylene glycol monomethyl ether,
tetraethylene glycol monoethyl ether,
tetraethylene glycol monoisopropyl ether,
tetraethylene glycol monobutyl ether,
tetraethylene glycol monooctyl ether,
tetraethylene glycol monodecyl ether,
tetraethylene glycol monohexadecyl ether,
tetraethylene glycol monooctadecyl ether,
polyethylene glycol monomethyl ether,
polyethylene glycol monoethyl ether,
polyethylene glycol monoisopropyl ether,
polyethylene glycol monobutyl ether,
polyethylene glycol monooctyl ether,
polyethylene glycol monodecyl ether,
polyethylene glycol monohexadecyl ether,
polyethylene glycol monooctadecyl ether,
dipropylene glycol monomethyl ether,
dipropylene glycol monoethyl ether,
dipropylene glycol monoisopropyl ether,
dipropylene glycol monobutyl ether,
dipropylene glycol monooctyl ether,
dipropylene glycol monodecyl ether,
dipropylene glycol monohexadecyl ether,
dipropylene glycol monooctadecyl ether,
tripropylene glycol monomethyl ether,
tripropylene glycol monoethyl ether,
tripropylene glycol monoisopropyl ether,
tripropylene glycol monobutyl ether,
tripropylene glycol monooctyl ether,
tripropylene glycol monodecyl ether,
tripropylene glycol monohexadecyl ether,
tripropylene glycol monooctadecyl ether,
tetrapropylene glycol monomethyl ether,
tetrapropylene glycol monoethyl ether,
tetrapropylene glycol monoisopropylether,
tetrapropylene glycol monobutyl ether,
tetrapropylene glycol monooctyl ether,
tetrapropylene glycol monodecyl ether,
tetrapropylene glycol monohexadecylether,
tetrapropylene glycol monooctadecylether,
polypropylene glycol monomethyl ether,
polypropylene glycol monoethyl ether,
polypropylene glycol monoisopropyl ether,
polypropylene glycol monobutyl ether,
polypropylene glycol monooctyl ether,
polypropylene glycol monodecyl ether,
polypropylene glycol monohexadecyl ether,
polypropylene glycol monooctadecyl ether,
diethyleneglycol tripropyleneglycol monomethyl ether,
tetraethyleneglycol dipropyleneglycol monomethyl ether,
tetraethyleneglycol tripropyleneglycol monomethyl ether,
tetraethyleneglycol tetrapropyleneglycol monomethyl ether,
pentaethyleneglycol dipropyleneglycol monomethyl ether,
pentaethyleneglycol tripropyleneglycol monomethyl ether,
diethyleneglycol tetrapropyleneglycol monomethyl ether,
hexaethyleneglycol dipropyleneglycol monomethyl ether,
hexaethyleneglycol dipropyleneglycol monomethyl ether,
hexaethyleneglycol tripropyleneglycol monomethyl ether,
hexaethyleneglycol tetrapropyleneglycol monomethyl ether,
hexaethyleneglycol pentapropyleneglycol monomethyl ether,
hexaethyleneglycol hexapropyleneglycol monomethyl ether,
heptaethyleneglycol dipropyleneglycol monomethyl ether,
heptaethyleneglycol dipropyleneglycol monomethyl ether,
heptaethyleneglycol tripropyleneglycol monomethyl ether,
heptaethyleneglycol tetrapropyleneglycol monomethyl ether,
heptaethyieneglycol pentapropyleneglycol monomethyl ether,
heptaaethyleneglycol hexapropyleneglycol monomethyl ether,
heptaaethyleneglycol heptapropyleneglycol monomethyl ether,
octaethyleneglycol dipropyleneglycol monomethyl ether,
octaethyleneglycol tripropyleneglycol monomethyl ether,
octaethyleneglycol tetrapropyleneglycol monomethyl ether,
octaethyleneglycol pentapropyleneglycol monomethyl ether,
octaethyleneglycol hexapropyleneglycol monomethyl ether,
octaethyleneglycol heptapropyleneglycol monomethyl ether,
polyethyleneglycol polypropyleneglycol monomethyl ether,
triethylene glycol,
tetraethylene glycol,
pentaethylene glycol,
hexaethylene glycol,
heptaethylene glycol,
octaethylene glycol,
decaethylene glycol,
tridecaethylene glycol,
hexadecaethylene glycol,
eicosaethylene glycol,
pentacosaethylene glycol,
triacosaethylene glycol,
tripropylene glycol,
tetrapropylene glycol,
pentapropylene glycol,
hexapropylene glycol,
heptapropylene glycol,
octapropylene glycol,
decapropylene glycol,
tridecapropylene glycol,
hexadecapropylene glycol,
eicosapropylene glycol,
pentacosapropylene glycol,
triacosapropylene glycol,
triethylene glycol tripropylene glycol,
tetraethylene glycol dipropylene glycol,
tetraethylene glycol tripropylene glycol,
tetraethylene glycol tetrapropylene glycol,
pentaethylene glycol dipropylene glycol,
pentaethylene glycol tripropylene glycol,
hexaethylene glycol dipropylene glycol,
hexaethylene glycol tripropylene glycol,
hexaethylene glycol pentapropylene glycol,
hexaethylene glycol hexapropylene glycol,
heptaethylene glycol dipropylene glycol,
triacosaethylene glycol dipropylene glycol,
heptaethylene glycol tripropylene glycol,
heptaethylene glycol tetrapropylene glycol,
heptaethylene glycol pentapropylene glycol,
heptaethylene glycol hexapropylene glycol,
heptaethylene glycol heptapropylene glycol, octaethylene glycol dipropylene glycol,
octaethylene glycol tripropylene glycol,
octaethylene glycol tetrapropylene glycol,
octaethylene glycol pentapropylene glycol,
octaethylene glycol hexapropylene glycol,
octaethylene glycol pentapropylene glycol,
octaethylene glycol octapropylene glycol,
polyethylene glycol polypropylene glycol,
tripropylene glycol triethylene glycol monomethyl ether,
tetrapropylene glycol diethylene glycol monomethyl ether,
tetrapropylene glycol triethylene glycol monomethyl ether,
tetrapropylene glycol tetraethylene glycol monomethyl ether,
pentapropylene glycol diethylene glycol monomethyl ether,
pentapropylene glycol triethylene glycol monomethyl ether,
pentapropylene glycol tetraethylene glycol monomethyl ether,
hexapropylene glycol diethylene glycol monomethyl ether,
hexapropylene glycol triethylene glycol monomethyl ether,
hexapropylene glycol tetraethylene glycol monomethyl ether,
hexapropylene glycol pentaethylene glycol monomethyl ether,
hexapropylene glycol hexaethylene glycol monomethyl ether,
heptapropylene glycol diethylene glycol monomethyl ether,
heptapropylene glycol triethylene glycol monomethyl ether,
heptapropylene glycol tetraethylene glycol monomethyl ether,
heptapropylene glycol pentaethylene glycol monomethyl ether,
heptapropylene glycol hexaethylene glycol monomethyl ether,
heptapropylene glycol heptaethylene glycol monomethyl ether
octapropylene glycol diethylene glycol monomethyl ether,
octapropylene glycol triethylene glycol monomethyl ether,
octapropylene glycol tetraethylene glycol monomethyl ether,
octapropylene glycol pentaethylene glycol monomethyl ether,
octapropylene glycol hexaethylene glycol monomethyl ether,
octapropylene glycol heptaethylene glycol monomethyl ether
octapropylene glycol octaethylene glycol monomethyl ether
polypropylene glycol polyethylene glycol monomethyl ether
tripropylene glycol triethylene glycol monomethyl ether,
tetrapropylene glycol triethylene glycol monomethyl ether,
tripropylene glycol triethylene glycol monomethyl ether,
octapropylene glycol diethylene glycol monomethyl ether,
octaethylene glycol dipropylene glycol monomethyl ether,
octaethylene glycol tripropylene glycol monomethyl ether,
octaethylene glycol tetrapropylene glycol monomethyl ether,
octaethylene glycol pentapropylene glycol monomethyl ether,
octaethylene-glycol hexapropylene glycol monomethyl ether,
octaethylene glycol heptapropylene glycol monomethyl ether,
octaethylene glycol octapropylene glycol monomethyl ether,
polyethylene glycol polypropylene glycol monomethyl ether.

A solvent or diluent may be incorporated into the raw materials such as boric acid, borate ester of lower alcohols and polyoxyalkylene, or into the borate esters of polyoxyalkylene.

If a solvent or diluent are employed, they must not disturb the esterification-dehydration or ester-exchange reaction and their boiling points should preferably be below the boiling point of the byproducts or polyoxyalkylenes.

Examples of solvents or diluents are ethers such as diethyl ether, dioxane, tetrahydrofran; aliphatic hydrocarbons such as hexane, acetic anhydride, heptane, octane, nonane, decane, undecane; aromatic hydrocarbons such as benzene, toluene, xylene; cycloalkaned such as cyclohexane, cyclohexene; non-proton polar compounds such as dimethy formamide, dimethyl sulfoxide, hexamethyl polyamide phosphate, acetonitrile, N-methyl pyrrolidone; and their chlorine substituted compounds such as chloroform and carbon tetrachloride.

A catalyst for the esterification dehydration or ester exchange reaction may be used.

If a catalyst is necessary for promoting the reaction, the following condensation catalysts are recommended.

Examples of the catalysts are metallic salts of organic acids such as ferrous octanoate, ferrous naphthenate, cobaltous naphthenate, manganese octanoate, stannum octanoate, stannum naphthenate, lead octanoate, lead naphthenate, organotin compounds such as dibuty tin diacetate, dibutyl tin dioctanoate dibutyl tin dilaurate, dibutyl tin dioleate, dibutyl tin dimethoxide, oxidized dibutyl tin; metal alcoholates such as tetrabuthyl titanate, tetrabutyl zirconate; titanium chelates such as di-isopropoxy bis-acetyl acetonate titanium, 1,3-propanedioxy bis-ethylacetonate titanium, 1,3-propanedioxy bis-ethylacetoacenate titanium; aluminum chelates such as aluminum acetyl acetonate, aluminum trisethylacetoacetonate; amines such as hexyl amine, dodecylamine phosphate, dimethyl hydroxyamine, diethyl hydroxyamine; tetra ammonium salts such as benzyl hydroxyamine; inorganic acids such as hydrochloric acid, nitric acid, sulfuric acid, phosphoric acid; organic acids such as acetic anhydride, pure acetic acid (over 99.8%), propionic acid, citric acid, benzoic acid, formic acid, acetic acid, oxalic acid, p-toluenesulfonic acid; chlorosilanes such as methyl trichlorosilane, dimethyl dichlorosilane; inorganic bases such as aqueous ammonia; organic bases such as ethylene diamine, triethanol amine; and amino alkylamine.

It is preferable that the esterification-dehydration or ester exchange reaction is carried out under reduced or atmospheric pressure and at a temperature of from 50 to 250° C., and preferably from 100 to 180° C.

During the reaction, removal of byproducts such as lower alcohols or water can precede the reaction easily because removal of byproducts precede the reaction equilibrium to favorable the formation of borate esters of polyoxyalkylenes.

As to the removal method, azeotropic distillation using azeotropic agents and batch or continuous distillation using distillation towers are preferred.

For the purpose of improving the properties of the borate ester of polyoxyalkylenes, amino-group containing compounds and/or solvents may be added to the borate esters of polyoxyalkylenes.

Adding the amino-group containing compounds to the borate ester of polyoxyalkylenes causes the suppression of borate ester hydrolysis and also improves rust preventive effects caused by the existence of water or its vapor.

Examples of the amino-group containing compounds include alkylamine, cyclo alkyl amine, alkanol amine, heterocyclic amine, diamine, lactam, cyclic imide and polyamine, which may be used alone or combination.

As the alkyl amine, there can be used methyl amine, dimethyl amine, trimethyl amine, ethyl amine, diethyl amine, tri ethyl amine, propyl amine, N,N-di[poly-(4) oxyethyl] hexadecyl amine, dodecyl dimethyl amine, stearamide propyl dimethyl amine, polyoxyethylene (3-30) octadecyl amine, polyoxyethylene (3-30) lauryl amine, polyoxyethylene (3-30) oleyl amine, polyoxyethylene (3-30) dilauryl amine, polyoxyethylene (3-30) stearyl amine, polyoxyethylene (3-30) alkyl amine, polyoxyethylene (3-30) dialkyl amine, and di(oleoyloxyethyl) hydroxy amine.

As the cycloalkyl amine, there can be used cyclohexyl amine, methyl cyclohexyl amine and ethyl cyclohexyl amine.

As the alkanol amine, there can be used ethanol amine, diethyl hydroxy methyl amine, diethanol amine, dimethyl amino ethanol, triethanol amine, propanolamine, dimethy 2-hydroxypropyl amine, butanol amine, methyl di (2-hydroxyethyl) amine, tri (2-hydroxyethyl) amine, hydroxymethyl di (2-hydroxyethyl) amine, dibenzil 2-hydroxypropyl amine and cyclohexyl di (2-hydroxyethyl) amine.

As the cycloalkanol amine, there can be used cyclohexanol amine, methylcyclohexanol amine and ethylcyclohexanol amine.

As the heterocyclic amine, there can be used use pyridine, lutidine, 3,4-xylidine, piperidine, N-methyl piperidine and N-ethyl piperidine.

As the lactam, there can be used propio lactam, N-methylpropio lactam, N ethyl butyro lactam, N-methyl varero lactam, N-methyl caprolactam and phenyl caprolactam.

As the cyclic imide, there can be used succinimide, N-methyl succinimide, N-ethyl succinimide, phenyl succinimide and 2-undecyl imidazoline.

As the diamine, there can be used ethylene diamine, triethylene diamine and tetraethylene diamine.

As the polyamine, there can be used diethylene triamine, triethylene tetramine and pentaethylene pentamine.

Among these amino-group containing compounds, tertiary amino-group containing compounds exhibit an excellent effect of preventing hydrolysis of borate ester of polyoxyalkylene and promote the cleaning and purging colored contaminants.

Examples of tertiary amino-group containing compounds having the above mentioned excellent properties are polyoxyethylene (3-30) octadecyl amine, polyoxyethylene (3-30) lauryl amine, polyoxyethylene (3-30) oleyl amine, polyoxyethylene (3-30) dilauryl amine, polyoxyethylene (3-30) stearyl amine, polyoxyethylene (3-30) alkyl amine, polyoxyethylene (3-30) dialkyl amine.

The amount of amino-group containing compound to 100 parts by weight of the borate ester of polyoxyalkylene is from 0 to 100 parts by weight, and preferably from 5 to 50 parts by weight and most preferably from 10 to 30 parts by weight.

Use of a solvent contributes to lower viscosity of the borate ester of polyoxyalkylene.

As a solvent, there can be used water, methyl alcohol, ethyl alcohol, isopropyl alcohol, butyl alcohol, isopropyl ether, ether, ethylene glycol, polyethylene glycol, polyethylene dimethyl ester, diethylene glycol, triethylene glycol, ethylene glycol dimethyl ether, diethylene glycol dimethyl ether, diethylene glycol diethyl ether, ethylene glycol dipropyl ether, triethylene glycol dimethyl ether, triethylene glycol monobuthyl ether, diethylene glycol monobutyl ether, diethylene glycol diethyl ether, diethylene glycol propyl ether, diethylene glycol dibuthyl ether, dimethyl ether, propylene glycol, acetone, methyethyl ketone, furfural, dioxane, methane sulfonate, diethy ether, tetra hydrofuran, hexane, acetic anhydride, heptane, octane, nonane, decane, undecane, benzene, toluene, xylene, cyclohexane, cyclohexene, dimethyl formamide, dimethy sulfoxide, hexamethyl triamide phosphate, acetonitrile, N-methyl pyrrolidone, chloroform and carbon tetrachloride and these solvents can be used alone or in combination.

The amount of solvent to 100 parts by weight of borate ester of polyoxyalkylene and amino-group containing compound are respectively from 0 to 100 parts by weight, and preferably from 5 to 50 parts by weight and most preferably from 10 to 30 parts by weight.

Ingredients other than amino-group containing compounds and/or solvents may be incorporated into the borate ester of polyoxyalkylene for the purpose of improving the properties of the release agents of the present invention.

As the other ingredients, there can be used stabilizers, neutralizers, antioxidants, ultraviolet absorbers, light stabilizers, anti-static agents, lubricants, processability improving agents, fillers, dispersing agents, coupling agents, anti-copper rusting agents, blowing agents, nuclear forming agents, anti-forming agents, deformers, colorants, pigments, dyeing agents, carbon black, water tree preventing agents, voltage stabilizers, anti-tracking agents, organic peroxide, crosslinking agents, disinfectants, antiseptics, anti-mold agents and anti-rust agents.

In the present invention, a release agent for metallic mold means a release agent which is coated on the surface of a metallic mold used for plastic or gum processing to prevent adhesion between the metallic mold and product molded therein, the release agent allowing the molded product to easily separate from the metallic mold.

Metallic molds for which the release agents of the present invention are applicable include those used for making the parts and structural materials for automobiles, autobicycles, scooters, televisions, radios, audio equipment, washing machines, rice cookers, personal computers, portable telephones, game machinery, building materials, office supplies, stationery, toys, sports goods, sports equipment, agricultural tools and marine tools by the methods of injection molding, blow molding, compression molding, slush molding, fluidized bed coating, flat film extrusion processing and inflation tubular film processing.

The material of mold may be metal or ceramic.

Plastics and gum which are processed by using the metallic mold of the present invention are thermoplastics and thermosetplastics as follows.

As the thermoplastic resin, there can be used high density polyethylene, high pressure low density polyethylenes such as HP-LDPE, EVA, EEA, Ionomer, olefin vinylalcohol copolymer, LLDPE, VLDPE, poly propylene (PP), polystylene (PS), acrylonitrile-butadiene-styrene copolymer (ABS), acrylonitrile-styrene copolymer (AS), acrylonitrile-butadiene copolymer, acrylonitrile acrylate-stylene copolymer, polyvinyl chloride (PVC), polyamide, polymethylmethacrylate (PMMA), polyacetal (POM), aminopolyacrylamide, polyarylate, fluorocarbon resin, polyimide (PI), polyaminobismaleimide (PABI), polyamideimide (PAI), polyetherimide (PEI), bismaleimidetriazine resin (BT), polysulfone, polybutylene terephthalate (PBT), polyethylene terephthalate (PET), polyvinylidene chloride, polycarbonate (PC), polyvinyl acetate, polyvinyl alcohol, polyvinyl ether, polyvinylformale, modified PPE, modified polyphenyleneoxide (PPO), polyphenylenesulfide (PPS), polyethersulfone (PESF), polyetheretherketone (PEEK), polyarysulfone (PAS), polymethylpenten (TPX), liquid crystal polymer, silicone resin, natural rubber (NR), butyl rubber (IIR), acrylonierile-butadiene rubber (NBR), chloroprene rubber (CR), styrene butadiene rubber (SBR), butadiene rubber (BR).

As the thermoplastic resin, there can be used phenolic resin, urea resin, melamine resin, diallyl phthalate resin, epoxy resin, unsaturated polyester resin, and the like.

The plastic molded products made by using the above mentioned resins are used for the parts and structural materials for automobiles, autobicycles, scooters, televisions, radios, audio equipment, washing machines, rice cookers, personal computers, portable telephones, game machinery, building materials, office supplies, stationery, toys, sports goods, sports equipment, agricultural tools and marine tools.

They are usually prepared by plastic processing methods such as injection molding, blow molding, compression molding, transfer molding, rotating molding, slush molding, inflation tubular film processing and extrusion molding.

The release agents of the present invention are prepared using one or more than one kind of borate ester of polyoxyalkylene.

The release agents may contain amino-group containing compounds and/or solvents.

The release agents may further contain surface active agents, pigments, dyes, inorganic fillers, dripping preventable agents, precipitation preventable agents, antioxidants and deformers.

The releases agent may be provided in aerosol containers together with a propellant.

Coating of the release agents of the present invention onto the surface of the metallic molds can be conducted by brushing, spraying, dipping or contacting the surfaces with a woven or nonwoven cloth which has been immersed in the release agents.

EXAMPLE

Now, the release agents for metallic molds used for forming plastic molded products according to the present invention will be described in further detail with reference to specific Examples.

However, it should be understood that the present invention is by no means restricted by such specific Examples.

Example 1

Borate ester of polyoxyalkylene expressed by chemical formula (5) was obtained by following synthesis process.

In a 7000 ml flask equipped with three inlet pipes and displaced by nitrogen gas were charged 146 g (1 mole) of triethyl borate [$B(OC_2H_5)_3$], 1.2 g of dibutyl tin dilaurate and 500 ml of benzene.

Subsequently, to the solution in the flask 664 g (2 mole) of tripropyleneglycol triethylenglycol monomethyl ether und 318 g (1 mole) of tripropyleneglycol triethylenglycol were added under stirring conditions to obtain a uniform blended solution.

Subsequently, the solution in the flask was stirred for 13 hours at 95° C. under distillation conditions to remove ethanol and benzene as the byproduct and to obtain 989 g (0.99 mole) of a borate ester of polyoxyalkylene expressed by chemical formula (5).

In a vessel, 100 parts by weight of a borate ester of polyoxyalkylene expressed by chemical formula (5), 15 parts by weight of triethyl amine and 10 parts by weight of ethanol were blended for 10 minutes at room temperature to obtain the release agent (1).

The release agent (1) was brushed onto the surface of a metallic mold for injection molding of polyacetal (POM) resin composition (made by Polyplastic Company Ltd.).

Using above mentioned metallic mold and resin composition, injection molding was conducted.

The period of time over which the release agent remained effective on the surface of the metallic mold was about 55 hours, this effective time period was very long as compared to a conventional release agent as shown in comparative example 1.

The term "effective time period" means the period from starting time to stopping time of injection molding with the stopping time being the time at which any one of the following phenomenons are observed: accumulating of dirty materials on the surface of metallic mold; clouding of the surface of the metallic mold; transferring the shape from the metallic mold to the plastic molded product; or transferring contaminants from the metallic mold to the plastic molded product.

Comparative Example 1

According to the same preparation method of Example 1, a release agent (2) consisting 100 parts by weight of high viscosity silicone oil (500 cs at 25° C.) and 20 parts by weight of the chlorinated type solvent was prepared.

This release agent was tested according to the same procedure as example 1.

The effective time period of this release agent on the mold was about 10 minutes.

Example 2

Borate ester of polyoxyalkylene expressed by chemical formula (8) was prepared according to the same method except pentaethylene glycol ethylether was used instead of tripropyle neglycol triethylenglycol monomethyl ether and tripropyleneglycol triethylenglycol.

Then, a release agent (3) consisting 100 parts by weight of borate ester of polyoxyalkylenes expressed by chemical formula (8) and 20 parts by weight of the pentaethyleneglycol was prepared.

This release agent was tested according to the same procedure as example 1.

The effective time period of this release agent on the metallic mold was about 48 hours. This effective time period was very long as compared to the conventional release agent shown in comparative example 1.

Example 3

Borate ester of polyoxyalkylene expressed by chemical formula (14) was prepared according to the same method except pentacosaethylene glycol was used instead of tripropyleneglycol triethylenglycol monomethyl ether and tripropyleneglycol triethylen glycol.

Then, a release agent (4) consisting 100 parts by weight of borate ester of polyoxyalkylene expressed by chemical formula (14) and 20 parts by weight of the polyoxyethylene (9) dilauryl amine was prepared.

This release agent was tested according to the same procedure as example 1.

The effective time period of this release agent on the metallic mold was about 65 hours. This effective time period was very long as compared to the conventional release agent as shown in comparative example 1.

What is claimed is:

1. A release agent for a metallic mold used for forming a plastic molded product which release agent comprises a borate ester of polyoxyalkylene expressed by the following formula (1)

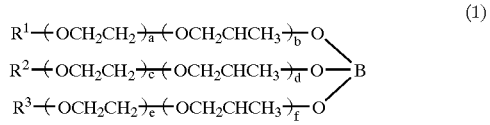

wherein $R^1$, $R^2$ and $R^3$ are independently selected from the group consisting of hydrogen and a hydrocarbon group, and wherein a, b, c, d, e and f, independently are integers from 0 to 30 with the proviso that the sum of a+b+c+d+e+f is from 6 to 80 and wherein the release agent further comprises an amino-group containing compound.

2. A release agent for a metallic mold used for forming a plastic molded product according to claim 1, wherein said amino-group containing compound is a polyoxyethylene allylamine.

* * * * *